United States Patent
Pritt et al.

(10) Patent No.: US 8,994,821 B2
(45) Date of Patent: Mar. 31, 2015

(54) METHODS AND APPARATUS FOR AUTOMATED ASSIGNMENT OF GEODETIC COORDINATES TO PIXELS OF IMAGES OF AERIAL VIDEO

(75) Inventors: Mark Pritt, Walkersville, MD (US); Kevin J. LaTourette, Tempe, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 873 days.

(21) Appl. No.: 13/188,190

(22) Filed: Jul. 21, 2011

(65) Prior Publication Data

US 2012/0218409 A1 Aug. 30, 2012

Related U.S. Application Data

(60) Provisional application No. 61/446,068, filed on Feb. 24, 2011.

(51) Int. Cl.
*H04N 7/18* (2006.01)
*G01C 11/06* (2006.01)
*G01C 11/36* (2006.01)

(52) U.S. Cl.
CPC ............ *G01C 11/06* (2013.01); *G01C 2011/36* (2013.01)
USPC ..................................... 348/144; 348/E7.085

(58) Field of Classification Search
USPC .......................................... 348/144, E07.085
See application file for complete search history.

(56) References Cited

U.S. PATENT DOCUMENTS

| | | | |
|---|---|---|---|
| 5,926,581 A | 7/1999 | Pritt | |
| 6,597,818 B2 | 7/2003 | Kumar et al. | |
| 7,019,773 B1 | 3/2006 | Heath | |
| 2001/0038718 A1* | 11/2001 | Kumar et al. | 382/284 |
| 2003/0044085 A1* | 3/2003 | Dial et al. | 382/293 |
| 2003/0218674 A1 | 11/2003 | Zhao et al. | |
| 2003/0218675 A1 | 11/2003 | Nonoyama | |
| 2005/0147324 A1 | 7/2005 | Kwoh et al. | |
| 2008/0140271 A1* | 6/2008 | Garceau et al. | 701/10 |
| 2009/0027417 A1 | 1/2009 | Horsfall et al. | |
| 2009/0154793 A1* | 6/2009 | Shin et al. | 382/154 |
| 2009/0256909 A1* | 10/2009 | Nixon | 348/144 |
| 2010/0068185 A1 | 3/2010 | Reber | |
| 2010/0100540 A1* | 4/2010 | Davis et al. | 707/728 |
| 2010/0232728 A1 | 9/2010 | Leprince et al. | |
| 2011/0007150 A1 | 1/2011 | Johnson et al. | |
| 2012/0027371 A1* | 2/2012 | Hackett et al. | 386/223 |

* cited by examiner

*Primary Examiner* — Thai Tran
*Assistant Examiner* — Nien-Ru Yang
(74) *Attorney, Agent, or Firm* — Ronald E. Prass, Jr.; Prass LLP

(57) ABSTRACT

A method and apparatus for automated assignment of geodetic coordinates to pixels of images of aerial video is disclosed. The method may include estimating a camera model for a first video frame of the aerial video, registering the first video frame to a Lidar DEM (digital elevation model) using the estimated camera model of the first video frame, iteratively refining the estimated camera model for the first video frame by composing the estimated camera model for the first video frame with the Lidar DEM registration, estimating a camera model for a next video frame of the aerial video by registering the next video frame to a previous video frame and composing the camera model of the next video frame with the previous video frame, and iterating for subsequent video frames.

18 Claims, 5 Drawing Sheets

METHODS AND APPARATUS FOR AUTOMATED ASSIGNMENT OF GEODETIC COORDINATES TO PIXELS OF IMAGES OF AERIAL VIDEO

PRIORITY INFORMATION

This application claims priority from U.S. Provisional Patent Application Ser. No. 61/446,068, filed Feb. 24, 2011, the content of which is incorporated herein by reference in its entirety.

BACKGROUND

1. Field of the Disclosed Embodiments

The disclosure relates to automated assignment of geodetic coordinates to images of aerial video.

2. Introduction

Manual methods are still required to geoposition aerial video as the lack of accurate camera models prevents automation. To overlay video on background imagery, a human analyst must extract a video frame and align it with imagery. To do this with accuracy over a mountainous area requires training in photogrammetry and a Digital Point Positioning Database (DPPDB), and it is an awkward process. The government has tried to automate the geopositioning of video in programs such as the National Geospatial-Intelligence Agency's (NGA's) GRIDLOCK, but these attempts have all failed. Complications include terrain uncertainties as well as the lack of accurate global positioning system (GPS) and inertial measurement unit (IMU) information. The best systems often have timing errors that create large uncertainties in the camera positions, and even when the systems are operating optimally, there are still errors of 50 meters or more. With several aerial systems, positioning errors of several hundred meters are not uncommon.

Programs are currently building an aerial video event detection system to aid military analysts. Some of the programs that have events that require geopositioning and cannot be handled. For example, the event, "Person entering building" could not be handled due to lack of geopositioning information. Simple tripwire events require a human analyst to mark the tripwire, but such manual intervention defeats the purpose of automation and should not be required. Furthermore, the lack of accurate geopositioning leads to misalignments that defeat tripwire event detection.

Automated video camera model determination processes have been used but this research is still immature. These processes place constraints on the trajectory of the video platform. Typically the platform must fly completely around the scene being imaged. If the platform hovers or does not change its position significantly, the process will not work. In general, sometimes the process works on aerial video, but more often than not, it fails. Even when it works, the process cannot geoposition the video. It only positions it relative to a synthetic coordinate frame. The user must manually add more information and transform this synthetic frame into a geographic coordinate frame.

Video stabilization can sometimes be accomplished by automated processes over very small areas where the scene is relatively flat. Over a large area where there is significant terrain relief, these processes do not work. In high-resolution wide area motion imagery systems (WAMI) such as a Government program entitled, "Constant Hawk", the problem of stabilization is still an area of research. However, it is unclear at this time how much success researchers will have with stabilizing the video over 3D structures like buildings and mountains.

SUMMARY OF THE DISCLOSED EMBODIMENTS

A method and apparatus for automated assignment of geodetic coordinates to pixels of images of aerial video is disclosed. The method may include estimating a camera model for a first video frame of the aerial video, registering the first video frame to a Lidar DEM (digital elevation model) using the estimated camera model of the first video frame, iteratively refining the estimated camera model for the first video frame by composing the estimated camera model for the first video frame with the Lidar DEM registration, estimating a camera model for a next video frame of the aerial video by registering the next video frame to a previous video frame and composing the camera model of the next video frame with the previous video frame, and iterating for subsequent video frames.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSED EMBODIMENTS

Figure 1:
FIG. 1 is an exemplary diagram of the aerial video and Lidar DEM inputs for the automated assignment of geodetic coordinates to images of aerial video in accordance with a possible embodiment of the disclosure.
Figure 1:
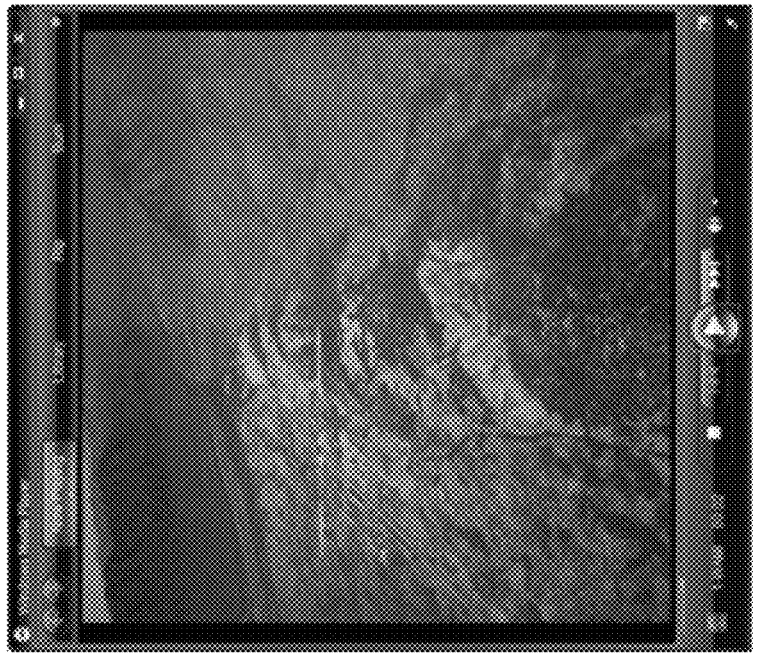

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Aspects of the embodiments disclosed herein relate to a method for automated assignment of geodetic coordinates to images of aerial video, as well as corresponding apparatus and computer-readable medium.

The disclosed embodiments may include a method for automated assignment of geodetic coordinates to images of aerial video. The method may include estimating a camera model for a first video frame of the aerial video, registering the first video frame to a Lidar DEM (digital elevation model) using the estimated camera model of the first video frame, iteratively refining the estimated camera model for the first video frame by composing the estimated camera model for the first video frame with the Lidar DEM registration, estimating a camera model for a next video frame of the aerial video by registering the next video frame to a previous video frame and composing the camera model of the next video frame with the previous video frame, and iterating for subsequent video frames.

The disclosed embodiments may include an apparatus for automated assignment of geodetic coordinates to images of aerial video. The apparatus may include a processor to: estimate a camera model for a first video frame of the aerial video, register the first video frame to a Lidar DEM (digital elevation model) using the estimated camera model of the first video frame, iteratively refine the estimated camera model for the first video frame by composing the estimated camera model for the first video frame with the Lidar DEM registration, estimate a camera model for a next video frame of the aerial video by registering the next video frame to a previous video frame and composing the camera model of the next video frame with the previous video frame, and iterate for subsequent video frames.

The disclosed embodiments may include a non-transient computer-readable medium storing instructions for automated assignment of geodetic coordinates to images of aerial video, the instructions comprising estimating a camera model for a first video frame of the aerial video, registering the first video frame to a Lidar DEM (digital elevation model) using the estimated camera model of the first video frame, iteratively refining the estimated camera model for the first video frame by composing the estimated camera model for the first video frame with the Lidar DEM registration, estimating a camera model for a next video frame of the aerial video by registering the next video frame to a previous video frame and composing the camera model of the next video frame with the previous video frame, and iterating for subsequent video frames.

The disclosed embodiments may geoposition, orthorectify and stabilize aerial video automatically. Geopositioning is the task of assigning three-dimensional geographic coordinates to image pixels. It may be required when combining or fusing video images with geographic data such as maps or GIS (geographic information systems) features. Closely related to geopositioning are orthorectification and stabilization. Orthorectification is the spatial transformation of imagery so it appears it was taken from an overhead view. Stabilization is the positioning of the frames of a video into alignment. If a video is orthorectified, then it may also be stabilized. Stabilization may be important in target detection, tracking and event detection. It may also be important when combining video imagery with imagery from another sensor such as a remote sensing satellite, for example.

Geopositioning, orthorectification and stabilization may be difficult to achieve over mountain and urban terrain, where alignment errors cause false alarms that confuse target tracking processes. There may be several phenomena that complicate these tasks. The first is known as foreshortening. The tops of tall objects such as buildings and mountains shift differently depending on the point of view. The direction of "up" can vary. Furthermore, buildings and mountains can obscure the ground behind them when not viewed directly from above. Clearly, geopositioning and stabilization are no simple matter.

Geopositioning, orthorectification and stabilization may require determination of the image camera model and the 3-D scene structure. Because aerial video does not normally include geopositioning information, it may be determined by the user. If the scene is not planar, this can be a difficult, if not impossible task. Often, the user must employ special software and laboriously geoposition each individual video frame. The process may be time-consuming, tedious and error-prone.

The concept of camera model may be essential. A camera model (or sensor model) may be a function that maps three-dimensional geographic coordinates to their corresponding two-dimensional image coordinates. Remotely sensed images often include camera models. For example, commercial satellite imagery providers like Digital Globe and Space Imaging provide rational cubic polynomial camera models with many of their image products. Aerial video rarely includes a camera model, but there are sometimes platform GPS data and pointing information. Video from military unmanned aerial vehicles, such as the Predator, sometimes include the platform coordinates, heading and range information in the video as metadata.

In addition to the camera model, knowledge of the three-dimensional structure of the scene may also be required. This structure may usually be specified as a digital elevation model (DEM), which may be a rectangular grid that defines the terrain elevation at each grid point. It may not usually be supplied by the image provider and may be obtained from a different source, such as the U.S. Geological Survey or a Lidar data provider, such as Airborne 1, the National Geospatial-Intelligence Agency (NGA) or the Army Geospatial Center (AGC). High-precision Lidar data from the BuckEye system or the ALIRT system may be used, both of which are high-resolution systems with post-spacings of 1 meter, for example. The disclosed embodiments may be applied to lower precision DEMs, such as the 10-meter post spacing DEMs available over the entire U.S. from the USGS, for example.

Embodiments of the present disclosure may provide an automated process for the georegistration of aerial video through the use of Lidar data. (Georegistration may be defined herein as the assignment of geodetic coordinates to images.) The present disclosure may use Lidar data to generate predicted images and matches these predicted images to the actual video images using cross correlation. It may then vary the parameters of the video camera model until the match is optimum.

FIG. 1 is a diagram of the aerial video 100 and Lidar DEM 110 inputs for the automated assignment of geodetic coordinates to images of aerial video in accordance with a possible embodiment of the disclosure. Aerial video 100 may overlap Lidar DEM (digital elevation model) 110. The present disclosure may georegister the video, i.e., assign accurate geodetic coordinates (from the DEM) so it can be "tied" to the ground. Any high-resolution DEM will work. Embodiments herein may use a Lidar DEM with 1 or 2-meter post spacing, although it is understood that DEM spacing may vary. This high resolution is needed for matching ground features to the video images.

Figure 2:
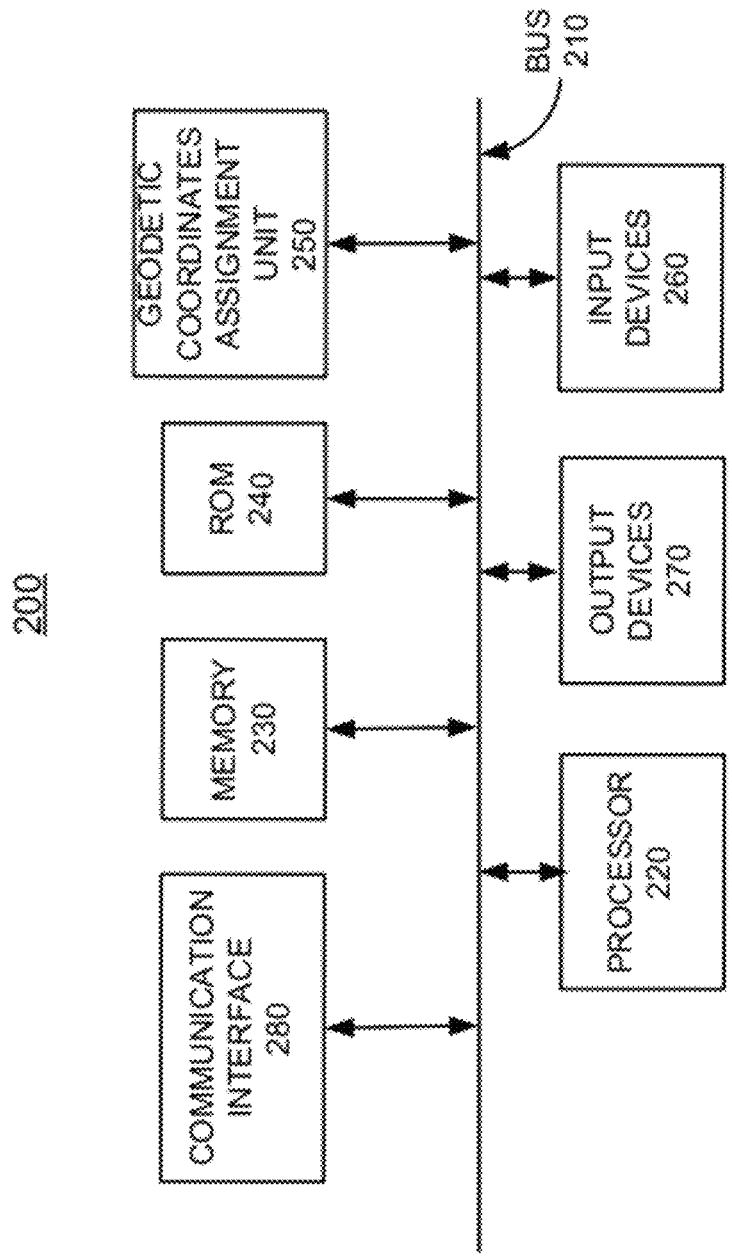
FIG. 2 is an exemplary block diagram of the automated geodetic coordinates assignment processing unit in accordance in accordance with a possible embodiment of the disclosure.

FIG. 2 is an exemplary block diagram of the automated geodetic coordinates assignment processing unit 200 in accordance in accordance with a possible embodiment of the disclosure. The exemplary automated geodetic coordinates assignment processing unit 200 may include bus 210, processor 220, memory 230, read only memory (ROM) 240, geodetic coordinates assignment unit 250, input devices 260, output devices 270, and communication interface 280. Bus 210 may permit communication among the components of the automated geodetic coordinates assignment processing unit 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Memory 230 may also represent any storage device that may include any type of media, such as, for example, magnetic or optical recording media and its corresponding drive.

Input devices 260 may include one or more conventional mechanisms that permit a user to input information to the automated geodetic coordinates assignment processing unit 200, such as a keyboard, a mouse, a pen, a voice recognition device, etc. Output devices 270 may include one or more conventional mechanisms that output information to the user, including a display, a printer, one or more speakers, or a medium, such as a memory, or a magnetic or optical disk and a corresponding disk drive.

Communication interface 280 may include any transceiver-like mechanism that enables the automated geodetic coordinates assignment processing unit 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the automated geodetic coordinates assignment processing unit 200, the communication interface 280 may not be included in the exemplary automated geodetic coordinates assignment processing unit 200 when the content management process is implemented completely within the automated geodetic coordinates assignment processing unit 200.

The automated geodetic coordinates assignment processing unit 200 may perform such functions in response to processor 220 by executing sequences of instructions contained in a computer-readable medium, such as, for example, memory 230, a magnetic disk, or an optical disk. Such instructions may be read into memory 230 from another computer-readable medium, such as a storage device, or from a separate device via communication interface 280.

The automated geodetic coordinates assignment processing unit 200 illustrated in FIG. 2 and the related discussion are intended to provide a brief, general description of a suitable computing environment in which the disclosure may be implemented. Although not required, the disclosure will be described, at least in part, in the general context of computer-executable instructions, such as program modules, being executed by the automated geodetic coordinates assignment processing unit 200, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

For illustrative purposes, the operation of the geodetic coordinates assignment unit 250 and the automated geodetic coordinates assignment process will be described below in FIG. 3 in relation to the block diagrams shown in FIG. 2.

Figure 3:
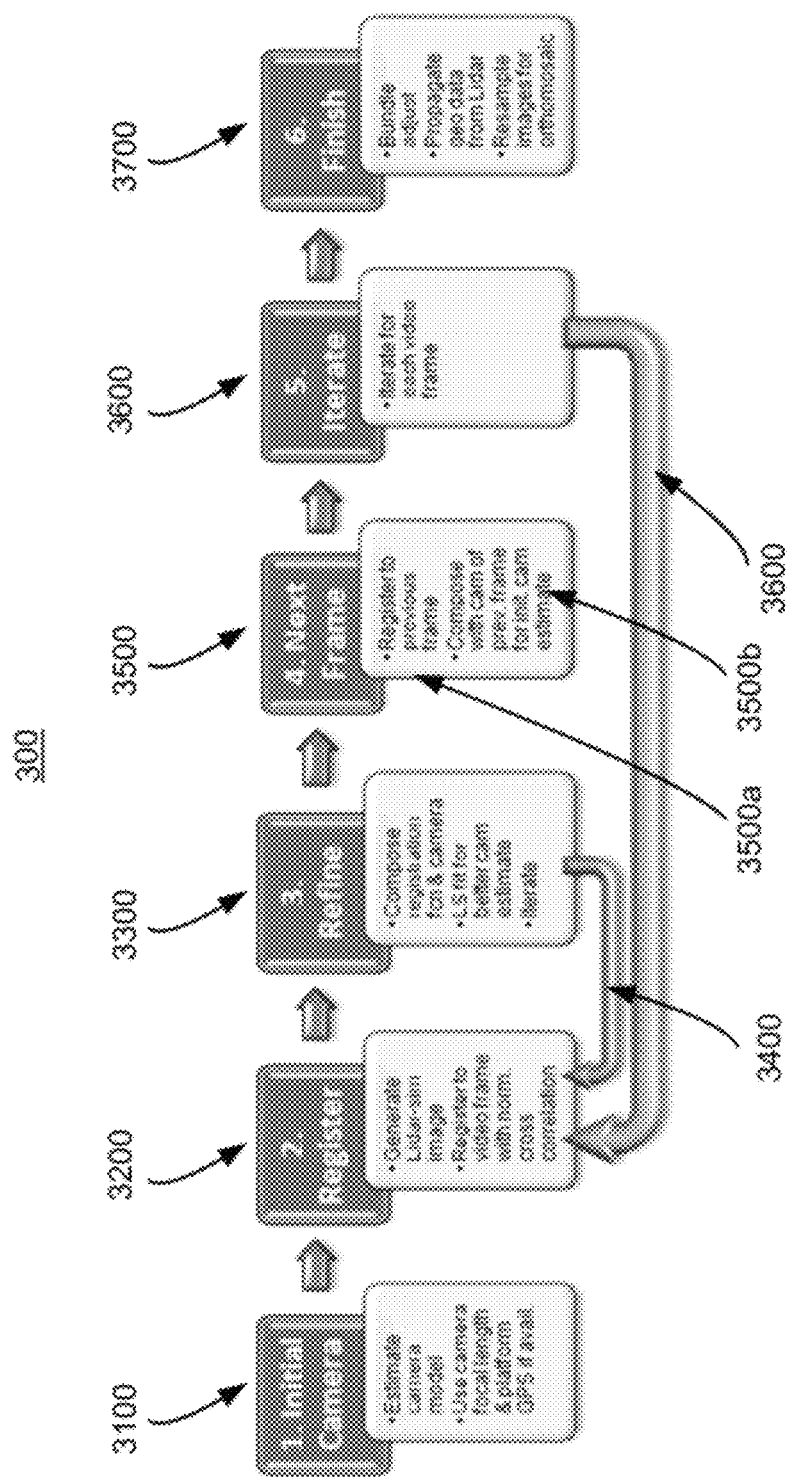
FIG. 3 is an exemplary flowchart illustrating the method of operation for automated assignment of geodetic coordinates to images of aerial video in accordance with one possible embodiment of the disclosure.

FIG. 3 is an exemplary flowchart illustrating the process operation for automated assignment of geodetic coordinates to images of aerial video in accordance with one possible embodiment of the disclosure.

The process may begin at step 3100 with initial camera estimation where the geodetic coordinates assignment unit 250 may estimate a camera model for the first video frame. This process can be done in several ways. If platform GPS and pointing information are available, as well as the interior orientation parameters, then an initial camera model estimate may be calculated. If none of this information is available, then a manual bootstrap may be required in which the first video frame is approximately aligned with the Lidar DEM.

At step 3200 may be frame-Lidar Registration, where the geodetic coordinates assignment unit 250 may register the video frame to the Lidar DEM using the camera model estimate. This process may be accomplished using the image-Lidar registration method, for example.

At step 3300, camera refinement is accomplished, where the geodetic coordinates assignment unit 250 may compose the camera model from step 3100 with the registration function from step 3200 to produce a better (or improved) camera model. For example, let the function f: W->S from the three-dimensional world to the two-dimensional Lidar-simulated image S denote the camera model, and let g: S->I denote the image registration function from the Lidar-simulated image to the actual image I. Then the composition mapping gf: W->I may represent the corrected camera model. Alternatively, this step can be improved by fitting the new camera model directly to the registration tie points composed with the previous camera model estimate, for example.

At step 3400, the geodetic coordinates assignment unit 250 may perform an iteration by going to step 3200 and iterating and refining the camera model with each iteration. In practice, only several iterations may be necessary. This process completes the registration of the video frame to the Lidar DEM. It may also produce the correct camera model for this frame. At step 3500, the geodetic coordinates assignment unit 250 determines an initial camera estimate of a next frame. This process is accomplished by the geodetic coordinates assignment unit 250 going to the next video frame and forming its initial camera model estimate as follows:

In step 3500a, the geodetic coordinates assignment unit 250 may register the video frame to the previous video frame, and in step 3500*b*, the geodetic coordinates assignment unit 250 may compose the camera model of the previous frame with the registration function from step 3500*a* in the same way the composition was performed in step 3300, for example.

Figure 4:
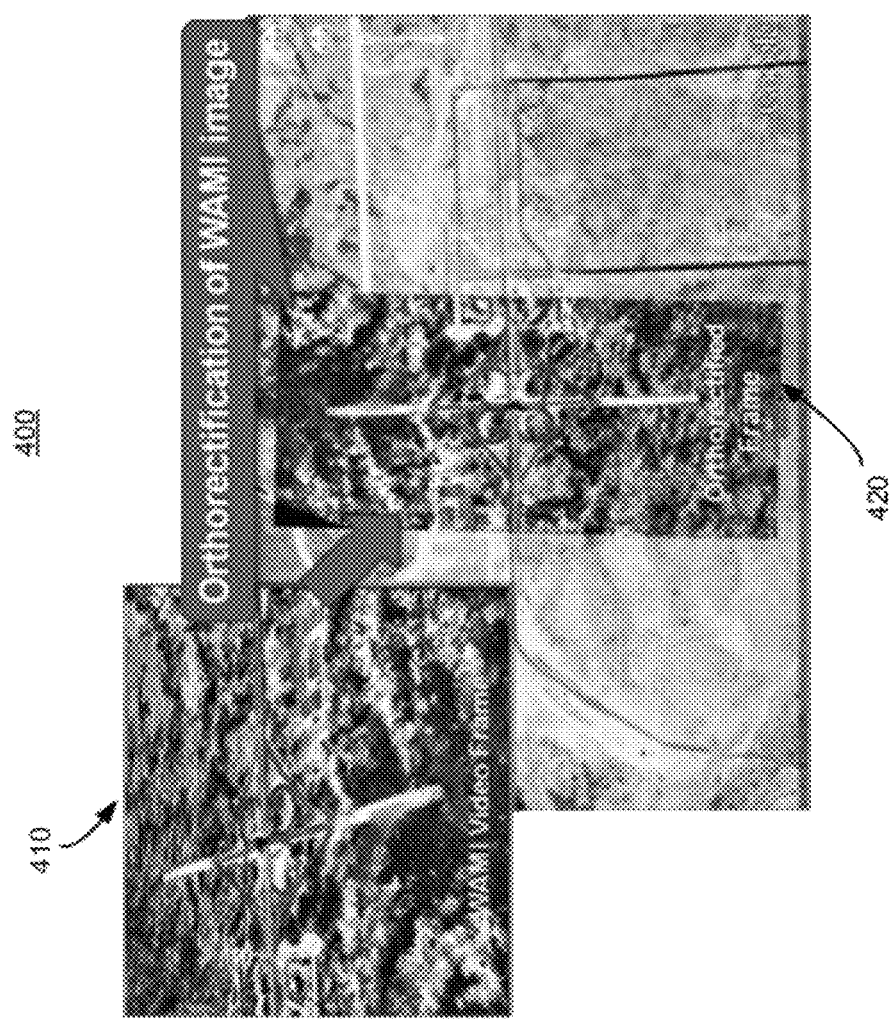
FIG. 4 is an exemplary illustration of the orthorectification of a WAMI video frame in accordance with a possible embodiment of the disclosure.

At step 3600, the geodetic coordinates assignment unit 250 may perform an iteration by going to step 3200 and repeating the process for all the video frames. At step 3700, the geodetic coordinates assignment unit 250 may perform post-processing. At this point, the geodetic coordinates assignment unit 250 may have determined all the camera models and registered all the frames. The geodetic coordinates assignment unit 250 may check registration quality and adjust frames if necessary, by means of normalized cross correlation, for example. In addition, the geodetic coordinates assignment unit 250 may perform the following:

Orthorectification and Stabilization: The geodetic coordinates assignment unit 250 may orthorectify frames by resampling them on the surface of the Lidar using the camera models, for example. This process may also stabilize the video frames, for example. FIG. 4 illustrates an exemplary orthorectification 400 of WAMI video frame 410 producing orthorectfied frame 420.

Figure 5:
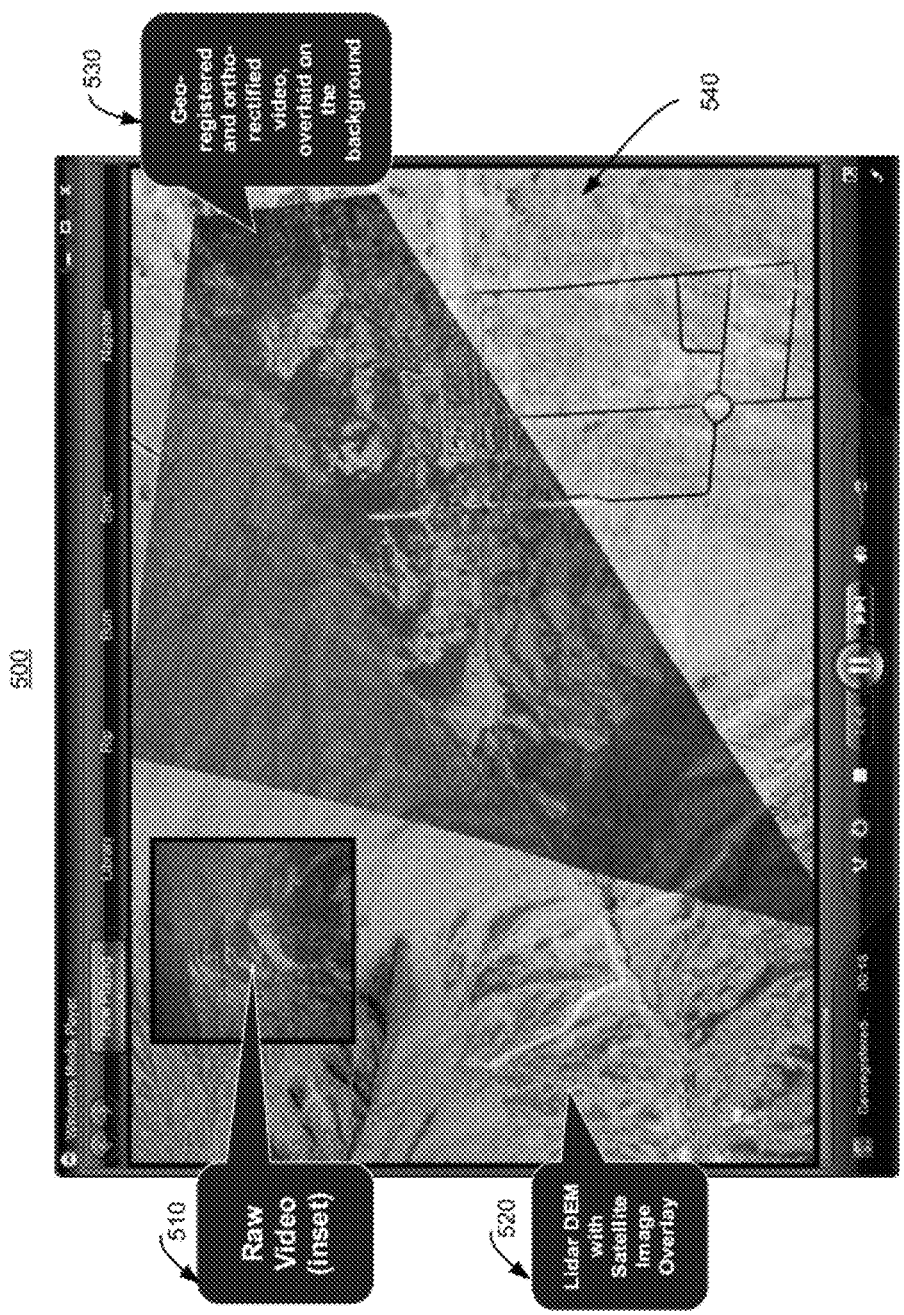
FIG. 5 illustrates an exemplary georegistered and orthorectified video overlaid on a background in accordance with a possible embodiment of the disclosure.

FIG. 5 shows an exemplary video image 500 that illustrates raw video 510 and Lidar DEM with satellite image overay 520 and the georegistered and orthorectified video 530, overlaid on the background 540. The images can then be overlaid on a map, DEM, or background image, or merged/fused with other data such as tracks, map vector data, or GIS shapefiles.

Geopositioning: The frames may be geopositioned by projecting the geographic coordinates from the Lidar DEM to the frames using the cameras. The latter projection may be more complicated because obscuration must be taken into account, so a form of ray tracing is required.

Moving Object Detection: Successive frames may be cross correlated, or differenced, to produce change detection images. Moving objects may show up as blobs that can be detected with a target tracking process. This detection and tracking may be possible even in mountainous or urban areas because of the use of a DEM to stabilize the video. (Conventional techniques break down for mountain or urban scenes.)

This process may have been tested and demonstrated to work on wide area motion imagery (WAMI) video from two different data collections. The process may also have been shown to work on aerial photography from the BuckEye system, for example. There may be a number of ways to modify and improve the process. One of these ways is explained in step 3300, for example. Another modification may be the way in which the registration is performed in step 3200; for example, it may be done in the image plane or on the surface of the Lidar DEM.

Embodiments of the present disclosure provide that one of the interesting by-products of the process described herein may be the recovery of the platform trajectory. While no platform GPS may be available, after the process is run on the data, the platform positions may be extracted from the camera models. Although not limited in this respect, the trajectory may be square-shaped when a platform is, for example, a helicopter. This trajectory recovery may reveal interesting corrections and timing differences in another set of data that included platform GPS. It may be clearly a valuable application of the process' results. Embodiments of the present disclosure may further provide processes described herein being successfully applied to the alignment and orthomosaicing of high-resolution aerial photography.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for automated assignment of geodetic coordinates to pixels of images of aerial video, comprising:

generating, with a processor, a first estimated camera model for a first video frame of the aerial video;

applying a Lidar digital elevation model (DEM), with the processor using the first estimated camera model to register the first video frame;

applying, with the processor, a plurality of iterative refinements to the first estimated camera model for the first video frame by composing the first estimated camera model for the first video frame with the Lidar DEM registration to generate a refined registration of the first video frame;

sampling, with the processor and with reference to the first estimated camera model, the refined registration of the first video frame on a surface of the Lidar DEM to orthorectify the refined registration of first video frame;

generating, with the processor, at least a second estimated camera model for a next video frame of the aerial video by registering the next video frame to the orthorectified refined registration of the first video frame and composing the at least the second estimated camera model of the next video frame with the orthorectified refined registration of the first video frame;

sampling, with the processor and with reference to the at least the second estimated camera model, the next video frame on the surface of the Lidar DEM to orthorectify the next video frame;

repeating the generating and the sampling for subsequent video frames of the aerial video; and assigning, with the processor, geodetic coordinates to pixels of images in the first video frame, the next video frame, and any subsequent video frames of the aerial video.

2. The method of claim 1, further comprising:
assessing, with the processor, registration quality; and
applying, with the processor, a normalized cross correlation to at least one of the first video frame, the next video frame and any subsequent video frames of the aerial video.

3. The method of claim 1, further comprising:
stabilizing, with the processor, at least one of the first video frame, the next video frame and any subsequent video frames of the aerial video by re-sampling the at least one of the first video frame, the next video frame and any subsequent video frames on the surface of the Lidar DEM using respective camera models.

4. The method of claim 1, further comprising:
performing, with the processor, one of a cross correlating or a differencing process to successive video frames to produce change detection images between the successive video frames.

5. The method of claim 1, further comprising:
recovering, with the processor, a trajectory for a platform on which a camera is mounted based on applying the refined first estimated camera model to the first video frame and the at least the second estimated camera model to the next video frame.

6. The method of claim 1, the generating the first estimated camera model comprising calculating the first estimated camera model based on available Global Positioning Satellite (GPS) system positioning of a camera, pointing information for the camera and interior orientation parameters for the camera.

7. An apparatus for automated assignment of geodetic coordinates to pixels of images of aerial video, comprising:
a communication interface; and
a geodetic coordinates assignment unit that is programmed to:
generate a first estimated camera model for a first video frame of the aerial video,
apply a Lidar DEM using the first estimated camera model to register the first video frame,
apply a plurality of iterative refinements to the first estimated camera model for the first video frame by composing the first estimated camera model for the first video frame with the Lidar DEM registration to generate a refined registration of the first video frame,
sample, with reference to the first estimated camera model, the refined registration of the first video frame on a surface of the Lidar DEM to orthorectify the refined registration of first video frame,
generate at least a second estimated camera model for a next video frame of the aerial video by registering the next video frame to the orthorectified refined registration of the first video frame and composing the at least the second estimated camera model of the next video frame with the orthorectified refined registration of the first video frame,
sample, with reference to the at least the second estimated camera model, the next video frame on the surface of the Lidar DEM to orthorectify the next video frame,
repeat the generating and the sampling for subsequent video frames of the aerial video, and
assign geodetic coordinates to pixels of images in the first video frame, the next video frame, and any subsequent video frames of the aerial video.

8. The apparatus of claim 7, the geodetic coordinates assignment unit being further programmed to:
assess registration quality, and
apply a normalized cross correlation to at least one of the first video frame, the next video frame and any subsequent video frames of the aerial video.

9. The apparatus of claim 7, the geodetic coordinates assignment unit being further programmed to stabilize at least one of the first video frame, the next video frame and any subsequent video frames by re-sampling the at least one of the first video frame, the next video frame and any subsequent video frames on the surface of the Lidar DEM using respective camera models.

10. The apparatus of claim 7, the geodetic coordinates assignment unit being further programmed to perform one of a cross correlating or a differencing process to successive video frames to produce change detection images between the successive video frames.

11. The apparatus of claim 7, the geodetic coordinates assignment unit being further programmed to recover a trajectory for a platform on which a camera is mounted based on applying the refined first estimated camera model to the first video frame and the at least the second estimated camera model to the next video frame.

12. The apparatus of claim 7, the geodetic coordinates assignment unit being further programmed to calculate the first estimated camera model based on available GPS system positioning of a camera, pointing information for the camera and interior orientation parameters for the camera.

13. A non-transitory computer-readable medium storing instructions for controlling a computing device to execute a method for automated assignment of geodetic coordinates to pixels of images of aerial video, the method comprising:
generating a first estimated camera model for a first video frame of the aerial video;
applying a Lidar DEM using the first estimated camera model to register the first video frame;
applying a plurality of iterative refinements to the first estimated camera model for the first video frame by composing the first estimated camera model for the first video frame with the Lidar DEM registration to generate a refined registration of the first video frame;
sampling, with reference to the first estimated camera model, the refined registration of the first video frame on a surface of the Lidar DEM to orthorectify the refined registration of first video frame;
generating at least a second estimated camera model for a next video frame of the aerial video by registering the next video frame to the orthorectified refined registration of the first video frame and composing the at least the second estimated camera model of the next video frame with the orthorectified refined registration of the first video frame;

sampling, with reference to the at least the second estimated camera model, the next video frame on the surface of the Lidar DEM to orthorectify the next video frame;

repeating the generating and the sampling for subsequent video frames of the aerial video; and assigning geodetic coordinates to pixels of images in the first video frame, the next video frame, and any subsequent video frames of the aerial video.

14. The non-transitory computer-readable medium of claim 13, the method further comprising:

assessing registration quality; and applying a normalized cross correlation to at least one of the first video frame, the next video frame and any subsequent video frames of the aerial video.

15. The non-transitory computer-readable medium of claim 13, the method further comprising:

stabilizing at least one of the first video frame, the next video frame and any subsequent the video frames by re-sampling the at least one of the first video frame, the next video frame and any subsequent video frames on the surface of the Lidar DEM using respective camera models.

16. The non-transitory computer-readable medium of claim 13, the method further comprising:

performing one of a cross correlating or a differencing process to successive video frames to produce change detection images between the successive video frames.

17. The non-transitory computer-readable medium of claim 13, the method further comprising:

recovering a trajectory for a platform on which a camera is mounted based on applying the refined first estimated camera model to the first video frame and the at least the second estimated camera model to the next video frame.

18. The non-transitory computer-readable medium of claim 13, the generating the first estimated camera model comprising calculating the first estimated camera model based on available GPS system positioning for a camera, pointing information for the camera and interior orientation parameters for the camera.

* * * * *